(12) United States Patent
Liu et al.

(10) Patent No.: US 6,297,952 B1
(45) Date of Patent: Oct. 2, 2001

(54) COMPUTER ENCLOSURE INCORPORATING A DRIVE BRACKET

(75) Inventors: Alvin Liu, Pa-Li; I-Fee Chen, Chung-Li, both of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/472,692

(22) Filed: Dec. 27, 1999

(30) Foreign Application Priority Data

Nov. 11, 1999 (TW) .................................................. 88219281

(51) Int. Cl.$^7$ ........................................................ G06F 1/16
(52) U.S. Cl. .................... 361/685; 361/726; 248/220.31; 312/223.1
(58) Field of Search ..................................... 361/683, 685, 361/724–727, 747, 730–732, 729, 735; 312/223.1, 223.2, 218, 216, 251.1, 333, 330.1, 332.1, 334.13; 369/77.2, 75.1, 77.1; 248/220.31, 224.8, 581, 60, 609, 611, 500, 346.06, 229.16, 220.22, 222.12; 360/137, 137 D, 900, 97.01, 98.01; 292/106, 31, 101; 20/453, 525; 307/53

(56) References Cited

U.S. PATENT DOCUMENTS

| | | | | |
|---|---|---|---|---|
| 5,680,293 | * | 10/1997 | McAnally et al. | 361/685 |
| 5,726,922 | * | 3/1998 | Womble et al. | 364/708.1 |
| 5,801,920 | * | 9/1998 | Lee | 361/685 |
| 6,018,457 | * | 1/2000 | Mroz | 361/685 |
| 6,030,062 | * | 2/2000 | Chen et al. | 312/223.1 |

* cited by examiner

*Primary Examiner*—Gerald Tolin
*Assistant Examiner*—Michael Datskorsky
(74) *Attorney, Agent, or Firm*—Wei Te Chung (57) ABSTRACT

A computer enclosure includes a cage, a drive bracket received in the cage, and a fastener attached to the drive bracket. The drive bracket includes a pair of side plates each defining a pair of recesses recessed from an inner surface thereof and a pair of holes. A pair of supporting tabs extends from the inner surface of each side plate for supporting a data storage device. The fastener forms a pair of pivoting portions for extending into and pivoting about the recesses of the drive bracket and a pair of fixing tabs for extending through the holes of the drive bracket to fix the data storage device.

20 Claims, 8 Drawing Sheets

COMPUTER ENCLOSURE INCORPORATING A DRIVE BRACKET

BACKGROUND OF THE INVENTION

1. Field of the Invention

The present invention relates to a computer enclosure, and particularly to a computer enclosure incorporating a drive bracket having a fastener for reducing clearance between the drive bracket and a data storage device received in the drive bracket.

2. Description of the Prior Art

A computer enclosure includes a drive bracket for receiving a data storage device such as a hard disk drive, a floppy disk drive or a CD-ROM drive. The data storage device is generally attached to the drive bracket by bolt or rail. Examples of conventional computer enclosures having a drive bracket are disclosed in Taiwan patent application Nos. 85210034; 86207656 and 86212064, and U.S. Pat. Nos. 5,599,080; 5,734,557 and 5,806,949. It is complicated and time-consuming to fix the data storage device to the drive bracket by bolts. Furthermore, the computer enclosure needs an extra operation space for assembling the data storage device to the drive bracket thereof by bolts.

To counter the problem caused by bolts fixing the data storage device to the drive bracket, the data storage device is fixed to the drive bracket by rail. Some rails are fixed to the drive bracket by bolts, which complicates the assembly procedure. Some rails form latches to readily fix to the drive bracket. However, the rails are generally made of plastics, which negatively reduce the grounding effect of the data storage device. Furthermore, the plastic rails are easily worn out to reduce the stability of data storage device after assembly.

Additionally, rails are attached between a data storage device and a drive bracket, which increase clearance between the data storage device and the drive bracket. However, the clearance increases the drive bracket and reduces the stability of the data storage device.

SUMMARY OF THE INVENTION

Accordingly, an object of the present invention is to provide a computer enclosure having a fastener for facilitating assembling of a data storage device to a drive bracket thereof.

Another object of the present invention is to provide a computer enclosure have a fastener for reducing clearance between a data storage device and a drive bracket thereof.

To fulfil the foregoing object of the present invention, a computer enclosure comprises a cage, a drive bracket received in the cage and a fastener attached to the drive bracket. The drive bracket includes a pair of side plates. One of the side plates defines a pair of recesses recessed from an inner surface thereof and a hole. A pair of supporting tabs extends from the inner surface of each side plate for supporting a data storage device. The fastener forms a pair of pivoting portions for extending into and pivoting about the recesses of the drive bracket and a fixing tab for extending through the hole of the drive bracket to fix the data storage device.

BRIEF DESCRIPTION OF THE DRAWINGS

Other objects and advantages of the present invention will be understood from the following description of a computer enclosure according to preferred embodiments of the present invention shown in the accompanying drawings, in which.

DETAILED DESCRIPTION OF THE PREFERRED EMBODIMENTS

For facilitating understanding, the like component is designated with a like number in different embodiments.

Figures 1, 2:
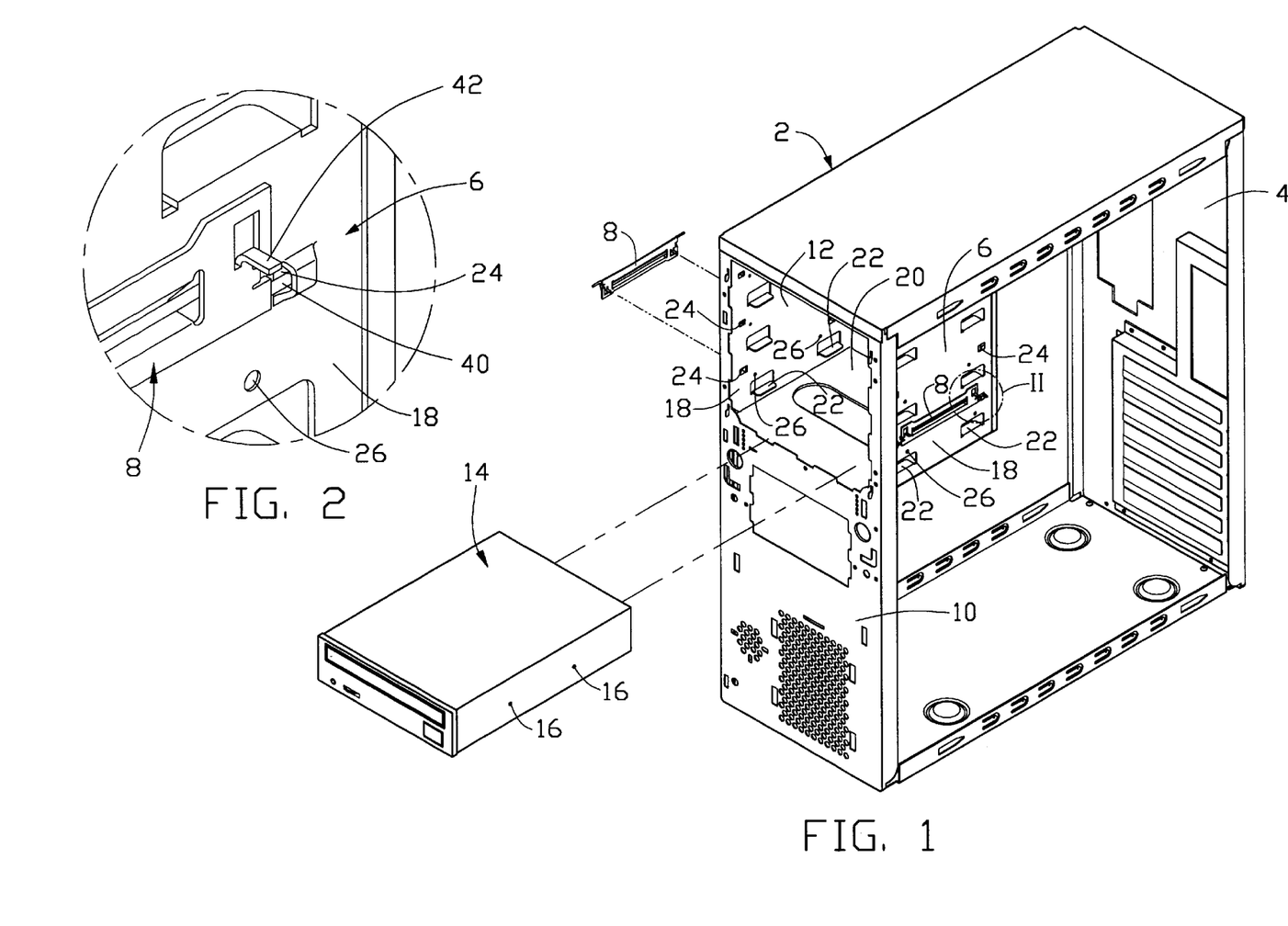
FIG. 1 is a perspective view of a computer enclosure embodying the concepts of the present invention with a fastener detached therefrom and with a CD-ROM drive to be received therein.
FIG. 2 is an enlarged view of an encircled portion II of FIG. 1.
Figure 3:
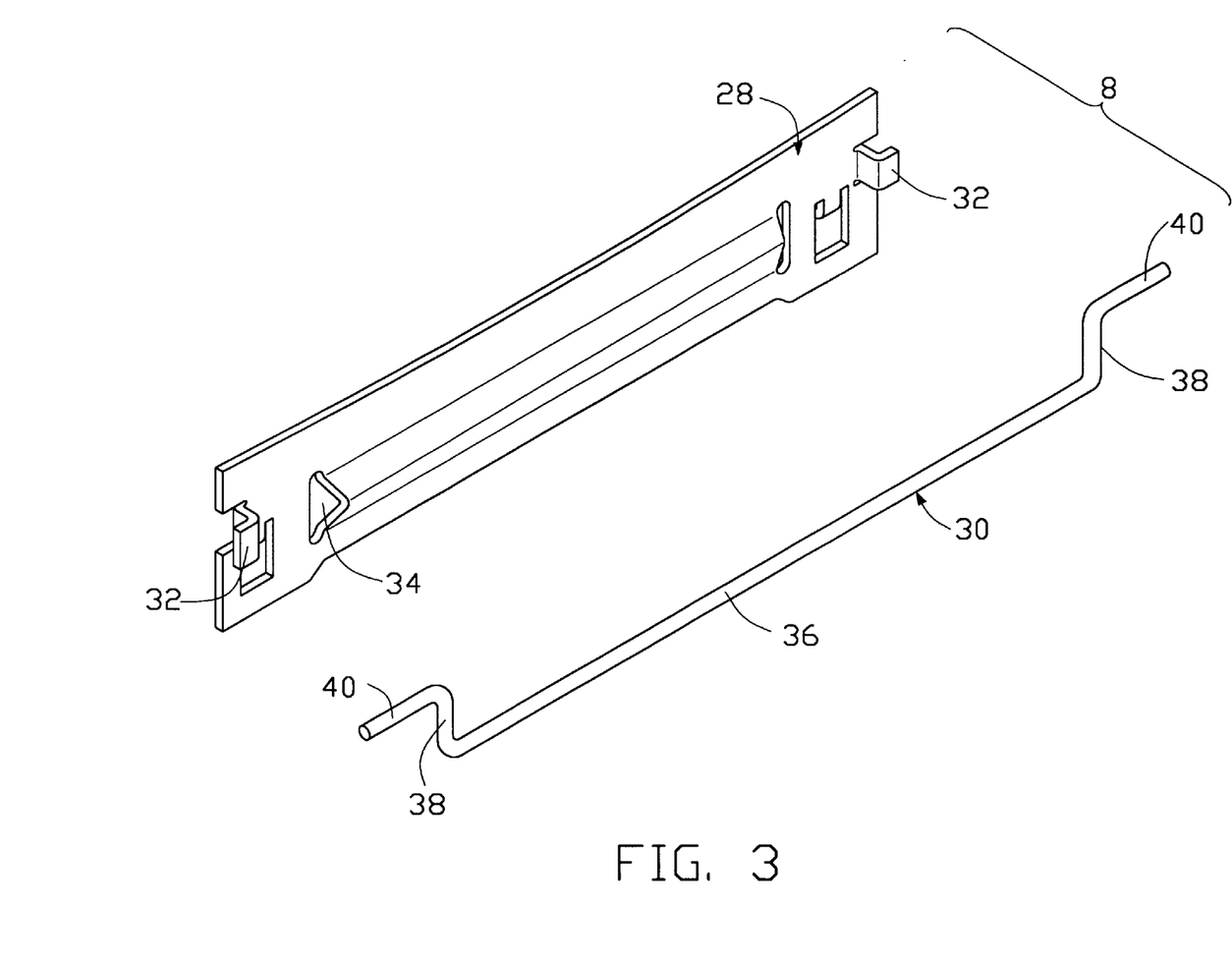
FIG. 3 is an exploded view of a fastener of FIG. 1.
Figure 4:
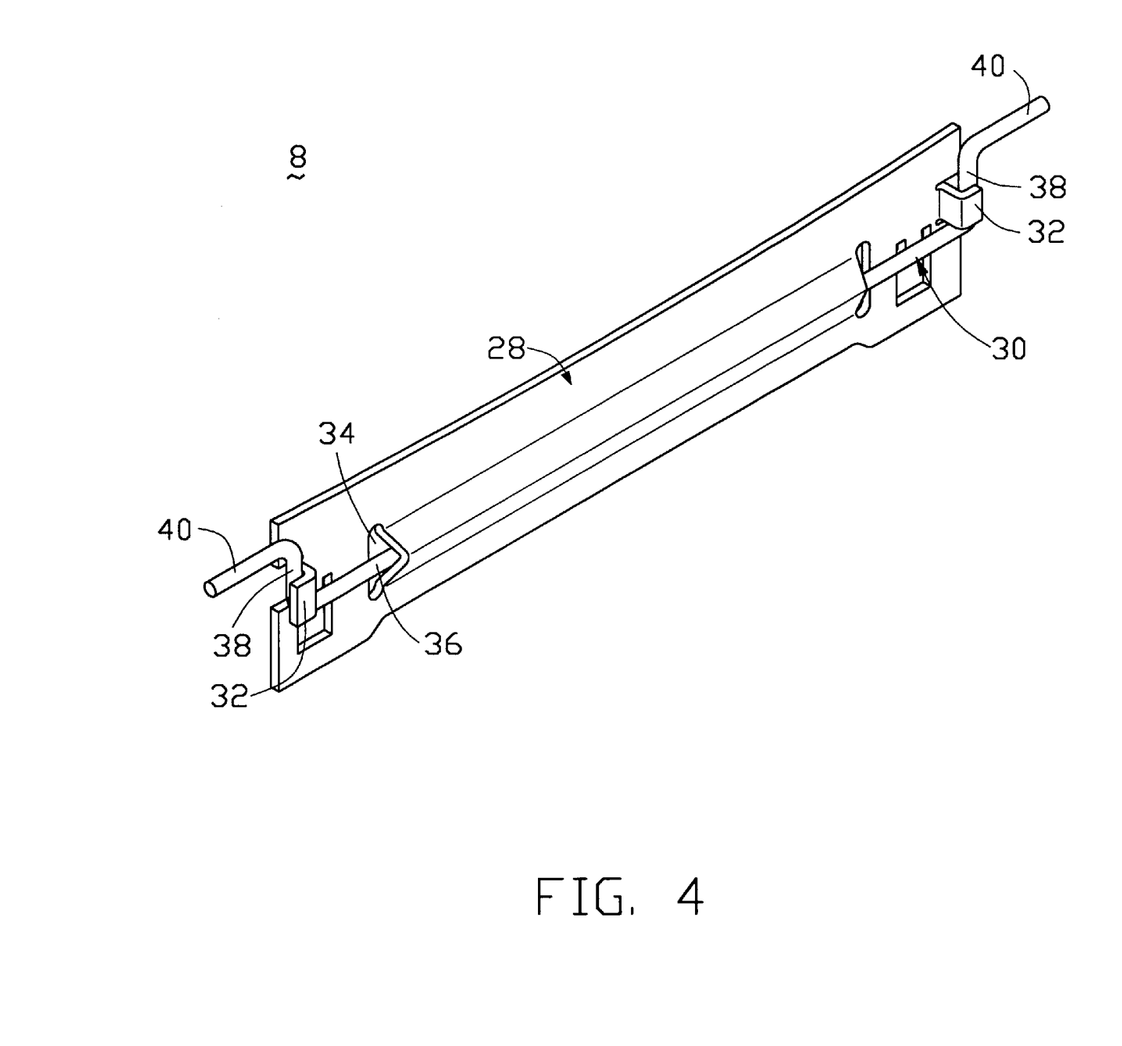
FIG. 4 is an assembled view of FIG. 3.
Figure 5:
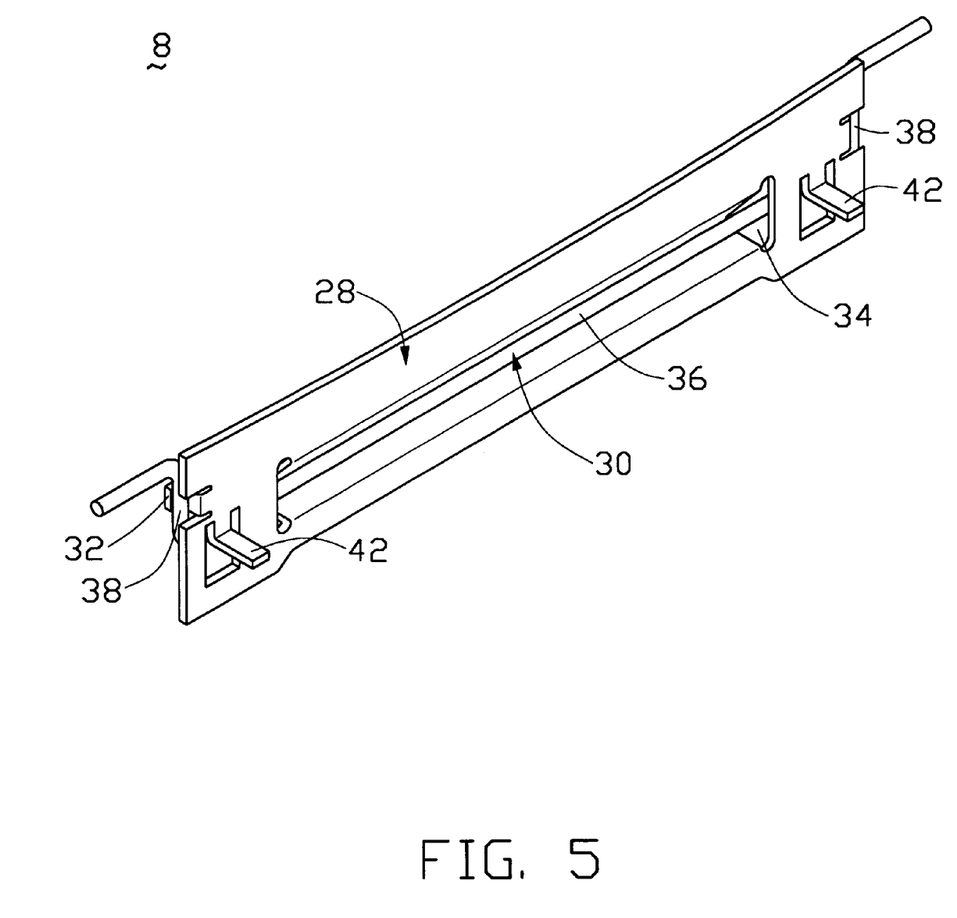
FIG. 5 is similar to FIG. 4 showing another side of the fastener.
Figure 6:
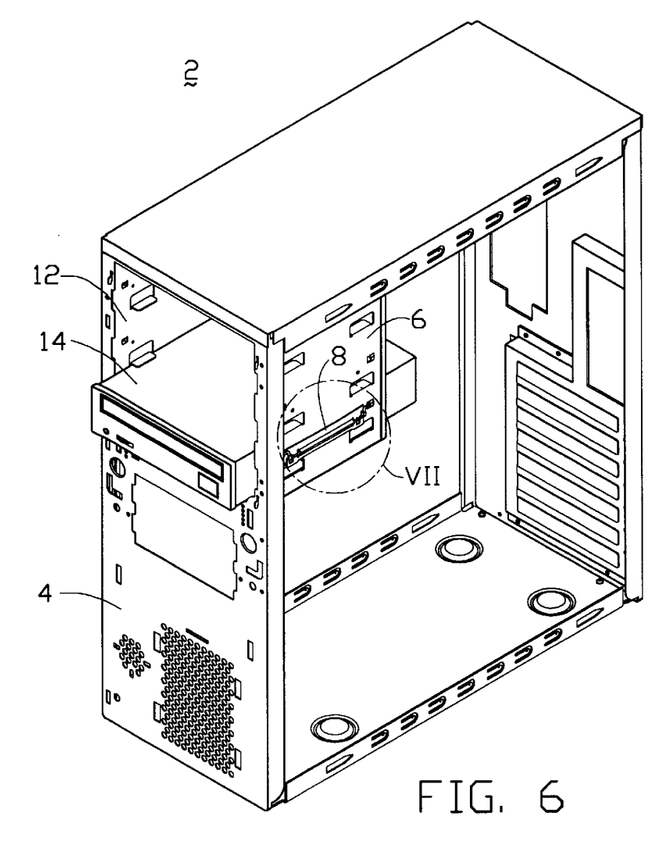
FIG. 6 is an assembled view of the computer enclosure of FIG. 1.
Figure 7:
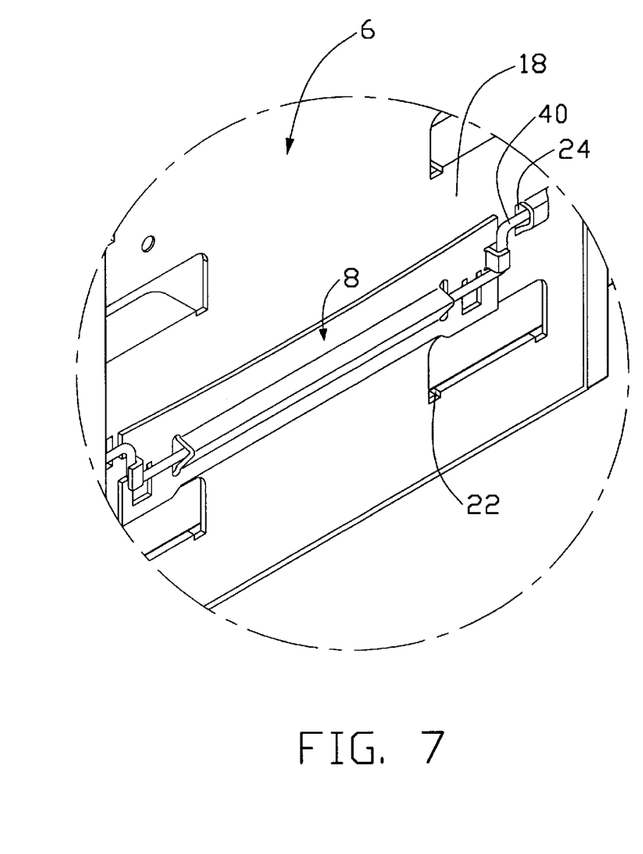
FIG. 7 is an enlarged view of an encircled portion VII of FIG. 6.
Figures 8, 9:
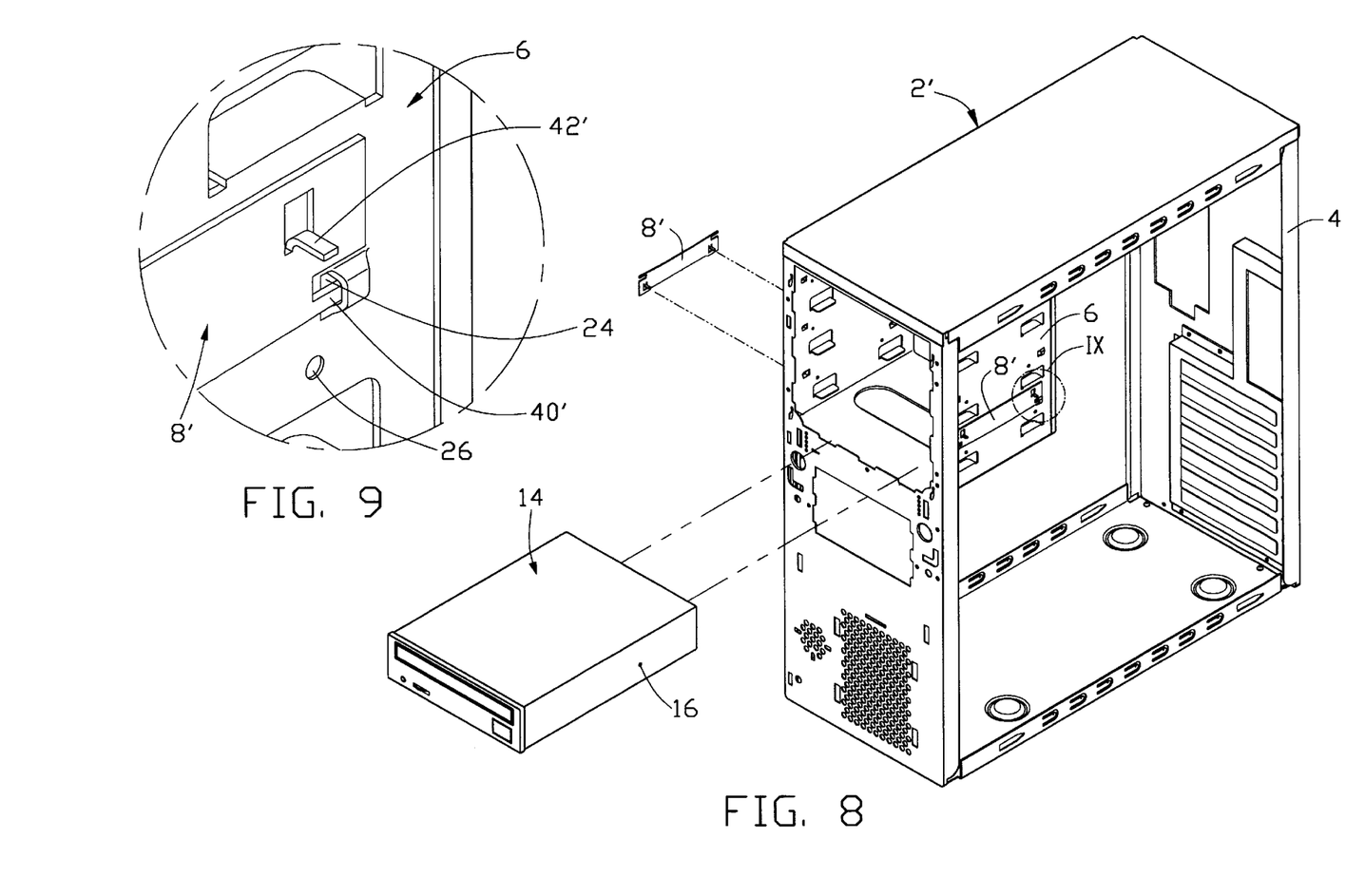
FIG. 8 is a perspective view of a computer enclosure in accordance with a second embodiment embodying the concepts of the present invention with a fastener detached therefrom and with a CD-ROM drive to be received therein.
FIG. 9 is an enlarged view of an encircled portion IX of FIG. 8.
Figure 10:
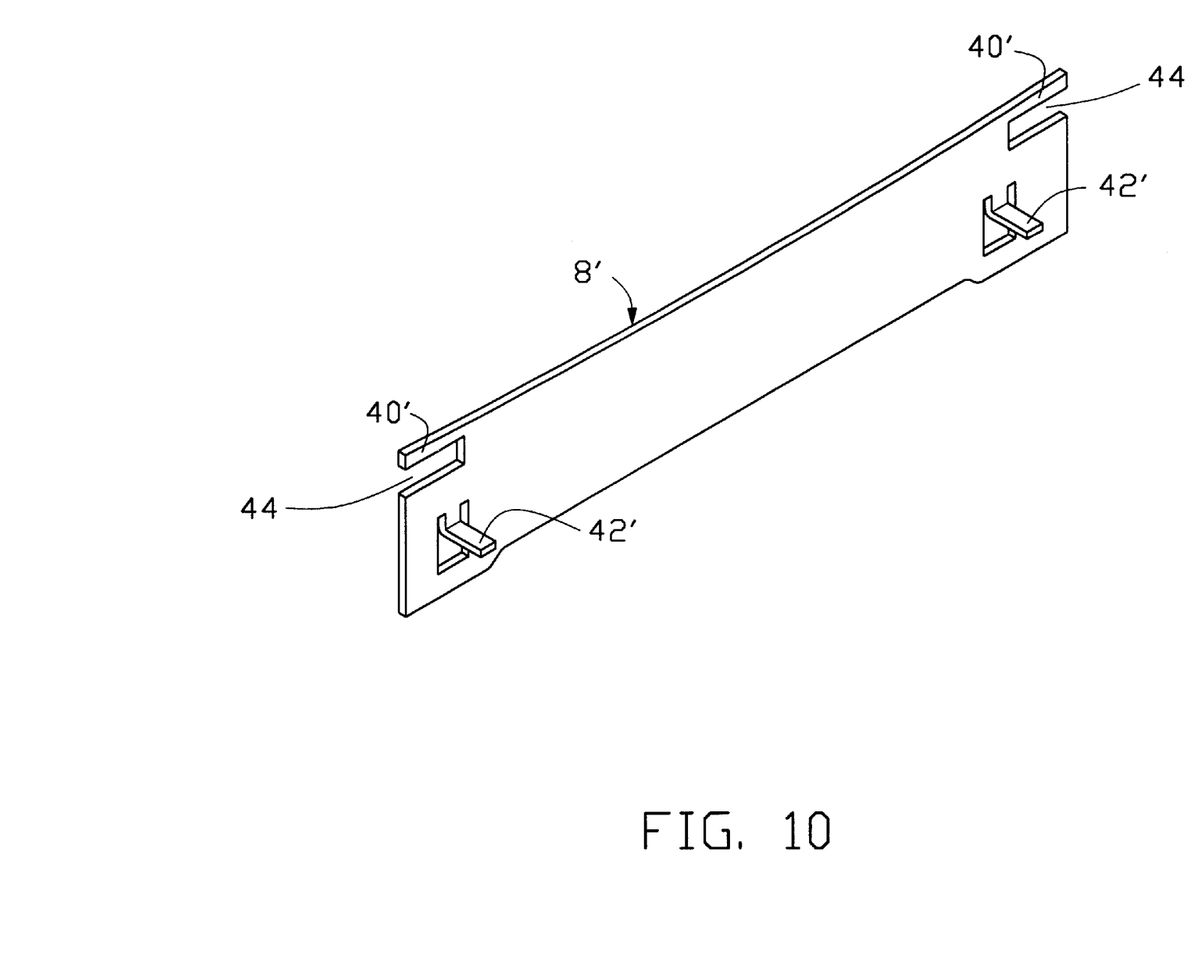
FIG. 10 is a perspective view of a fastener of a second embodiment of the present invention.
Figure 11:
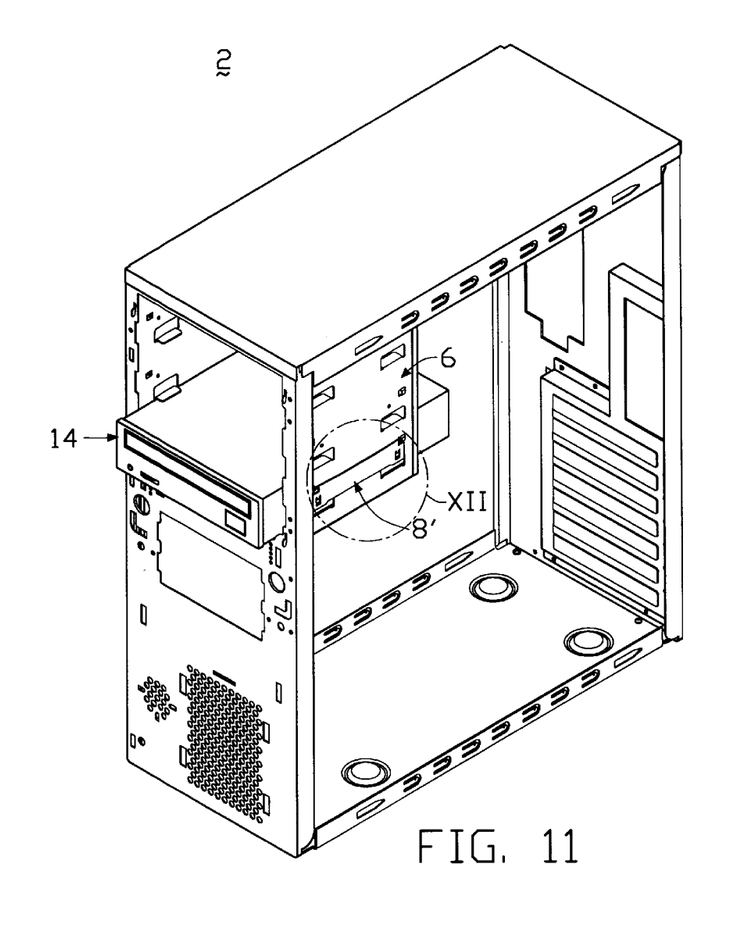
FIG. 11 is an assembled view of FIG. 9.
Figure 12:
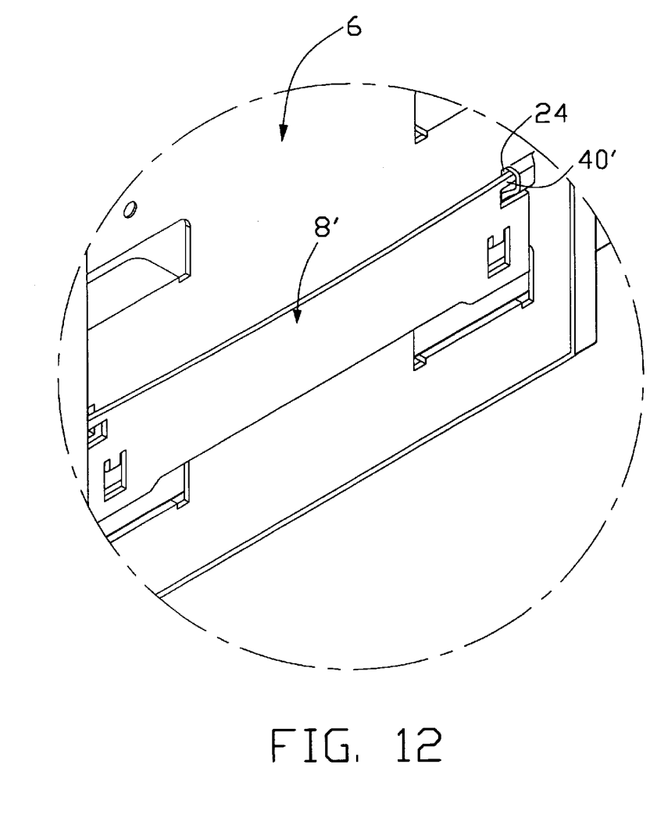
FIG. 12 is an enlarged view of an encircled portion XII of FIG. 11.

Referring to FIG. 1, a computer enclosure 2 in accordance with a first embodiment of the present invention comprises a cage 4, a drive bracket 6 mounting on the cage 4 and a pair of fasteners 8 attached to the drive bracket 6. The cage 4 includes a front panel 10 defining an opening 12 for providing access to a data storage device to be received in the drive bracket 6. In the embodiment, the data storage device is a CD-ROM drive 14 which respectively defines a pair of apertures 16 in opposite side walls thereof.

The drive bracket 6 is U-shaped and includes a pair of side plates 18 and a connecting plate 20 connected between the side plates 18. Three pairs of supporting tabs 22 extend from an inner surface of each side plate 18 and are arranged in three levels for respectively supporting three data storage devices. Three pairs of U-shaped recesses 24 formed by stamping are located in each side plate 18 and arranged in three levels respectively adjacent to the supporting tabs 22. Three pairs of holes 26 are defined in each side plate 18 and arranged in three levels respectively adjacent to the recesses 24.

Referring to FIGS. 1–5, the fastener 8 includes a body 28 and a pivoting lever 30 fixed to the body 28. The body 28 forms a pair of bent tabs 32 at opposite ends thereof and an elongate recess 34 having a V-shape in cross-section between the pair of bent tabs 32. The lever 30 includes a base portion 36 extending through the elongate recess 34 of the body 28, a pair of fixing portions 38 perpendicularly extending from opposite ends of the base portion 36 for engaging with the bent tabs 32 of the body 28. A pair of pivoting portions 40 respectively extends from the fixing portions 38 for inserting into and pivoting about the recesses 24 of the drive bracket 6. A pair of fixing tabs 42 extends from the body 28 of the fastener 8 opposite the bent tabs 32 for extension through the holes 26 of the drive bracket 6 and into the apertures 16 of the CD-ROM drive 14.

Referring to FIGS. 1, 2, 6 and 7, in assembly, the CD-ROM drive 14 is inserted into the opening 12 of the cage 4 to be supported and received in the drive bracket 6 by the supporting tabs 22 of the drive bracket 6, with each aperture 16 thereof aligning with the hole 26 of the side plate 18. The fastener 8 is firstly attached to the drive bracket 6 by inserting the pivoting portions 40 thereof into the recesses 24 of the drive bracket 6. Each fastener 8 is then pivotably rotated for substantially 180 degrees with respect to the in-lined recesses 24 until each fixing tab 42 thereof extends through the aligned hole 26 of the drive bracket 6 and the aperture 16 of the CD-ROM drive 14 for readily fixing the CD-ROM drive 14. Since the fasteners 8 are situated outside of the drive bracket 6, clearance between the CD-ROM drive 14 and the side plates 18 of the drive bracket 6 is reduced.

Referring to FIGS. 8–12, a computer enclosure 2' in accordance with a second embodiment of the present invention includes a cage 4, a drive bracket 6 and a pair of fasteners 8' attached to the drive bracket 6 for fixing a CD-ROM drive 14. Particularly referring to FIG. 10, each fastener 8' defines a pair of cutouts 44 at opposite ends thereof to form a pair of pivoting portions 40' for extending into and pivoting about the recesses 24 of the drive bracket 6. A pair of fixing tabs 42' extends from the fastener 8' for extending through the holes 26 of the drive bracket 6 and the apertures 16 of the CD-ROM drive 14 after the CD-ROM drive 14 is slid into the drive bracket 6 in position similar to those disclosed in the first embodiment. In assembly, particularly referring to FIG. 9, the fastener 8' is firstly pivotably attached to the drive bracket 6. Secondly, the CD-ROM drive 14 is slid into the drive bracket 6 in position so that each hole 26 is in alignment with a corresponding aperture 16. Finally, the fastener 8' is rotated for substantially 180 degrees for inserting each fixing tab 42' into the aligned hole 26 and aperture 16. Thus, the fasteners 8' easily fix the CD-ROM drive 14 to the drive bracket 6. Clearance between the CD-ROM drive 14 and the drive bracket 6 is reduced, since the fasteners 8' are attached to outsides of the drive bracket 6.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer enclosure comprising:
    a cage;
    a drive bracket attached to the cage and including a pair of side plates, one of the side plates defining a pair of recesses recessed from an inner surface thereof and a hole, a pair of supporting tabs extending from the inner surface of each side plate for supporting a data storage device; and
    a fastener attached to the drive bracket for fixing the data storage drive, the fastener forming a pair of pivoting portions for extending into and pivoting about the recesses of the drive bracket and a fixing tab for extending through the hole of the drive bracket to fix the data storage device.

2. The computer enclosure as described in claim 1, wherein the drive bracket defines a pair of holes, and wherein the fastener includes a pair of fixing tabs for extending through the holes of the drive bracket.

3. The computer enclosure as described in claim 1, wherein the fastener includes a body and a pivoting lever attached to the body.

4. The computer enclosure as described in claim 3, wherein the pivoting lever includes a pair of fixing portions, and wherein the pair of pivoting portions extends from the fixing portions.

5. The computer enclosure as described in claim 4, wherein the body forms a pair of bent tabs for fixing the fixing portions of the pivoting lever.

6. The computer enclosure as described in claim 5, wherein the fixing tab extends from the body opposite the bent tab.

7. The computer enclosure as described in claim 4, wherein a base portion extends between the fixing portions of the pivoting lever, and an elongate recess is defined in the body for extension of the base portion of the pivoting lever.

8. The computer enclosure as described in claim 1, wherein the fastener defines a pair of cutouts at opposite ends to form the pair of pivoting portions.

9. A computer enclosure comprising:
    a cage;
    a drive bracket attached to the cage and including a pair of side plates for receiving a data storage device therebetween; and
    a fastener pivotably attached to the drive bracket for fixing the data storage drive, the fastener forming a pair of fixing tabs for extending through the drive bracket to fix the data storage device.

10. The computer enclosure as described in claim 9, wherein each side plate defines a pair of recesses recessed from an inner surface thereof, and wherein the fastener forms a pair of pivoting portions for extending into and pivoting about the recesses of the drive bracket.

11. The computer enclosure as described in claim 9, wherein a pair of supporting tabs extending from an inner surface of each side plate for supporting the data storage device.

12. The computer enclosure as described in claim 9, wherein the drive bracket defines a pair of holes for extension of the fixing tabs of the fastener.

13. The computer enclosure as described in claim 9, wherein the fastener includes a body and a pivoting lever attached to the body.

14. The computer enclosure as described in claim 13, wherein the pivoting lever includes a pair of fixing portions and a pair of pivoting portions extending from the fixing portions for pivoting about the drive bracket.

15. The computer enclosure as described in claim 14, wherein the body forms a pair of bent tabs for fixing the fixing portions of the pivoting lever.

16. The computer enclosure as described in claim 15, wherein the fixing tab extends from the body opposite the bent tab.

17. The computer enclosure as described in claim 14, wherein a base portion extends between the fixing portions of the pivoting lever, and a elongate recess is defined in the body for extension of the base portion of the pivoting lever.

18. The computer enclosure as described in claim 9, wherein the fastener defines a pair of cutouts at opposite ends to form a pair of pivoting portions for pivoting about the drive bracket.

19. A computer enclosure assembly comprising:
    a cage;
    a drive bracket attached to the cage and defining a space therein and a pair of side plates thereof;
    a fastener pivotally fastened to an outer surface of each of said side plates of the drive bracket, said fastener including a fixing tab; and a data storage device defining at least an aperture in each of side walls; wherein
said drive bracket defines a front opening so as to allow the data storage device to be installed into the space in a front-to-back direction, and a lateral hole in each side plates for allowing the fixing tab to extend therethrough and into the corresponding aperture of the data storage device.

20. The assembly as described in claim 19, wherein said fastener is pivotable with regard to the side plate of the drive about a horizontal axis along an insertion direction of the data storage device bracket, so as to define an upper position and a lower position of the fastener with regard to the side plate, and wherein said fixing tab extends outwardly when said fastener is positioned in the upper position while extends inwardly when said fastener is positioned in the lower position.

* * * * *